No. 794,519.                                                                    Patented July 11, 1905.

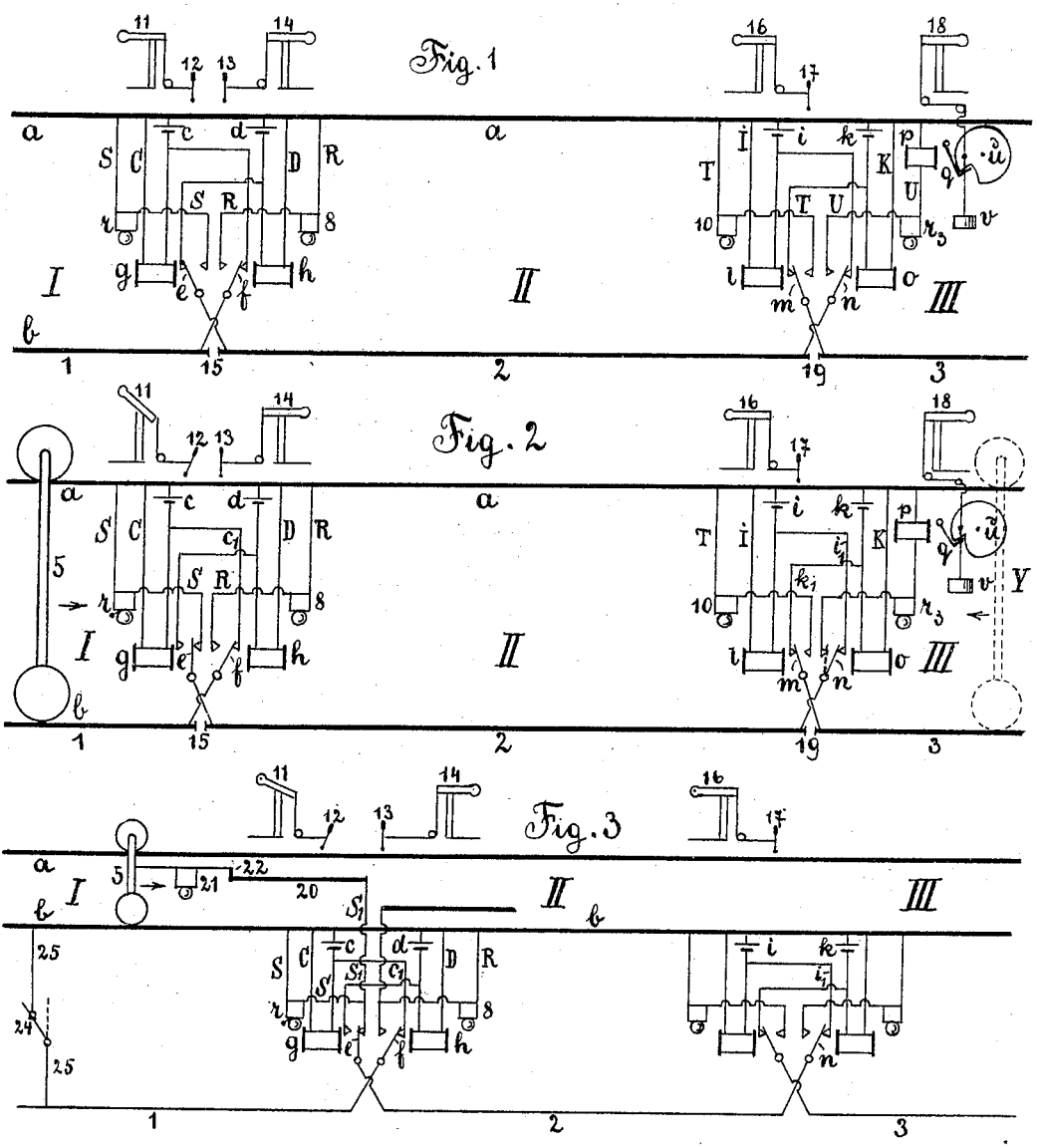

UNITED STATES PATENT OFFICE.

JÖRG LANZ, OF RODAUN, NEAR VIENNA, AUSTRIA-HUNGARY.

AUTOMATIC BLOCK-SIGNAL SYSTEM.

SPECIFICATION forming part of Letters Patent No. 794,519, dated July 11, 1905.

Application filed January 21, 1903. Serial No. 139,994.

*To all whom it may concern:*

Be it known that I, JÖRG LANZ, a citizen of Austria-Hungary, residing at Rodaun, near Vienna, Austria-Hungary, have invented a new Automatic Block-Signal System for the Regulation of Railway Traffic, of which the following is a specification.

This invention has for its object to provide a perfectly safe, economical, and automatic regulation of railway traffic in order to avoid collisions, as well as of trains following each other in the same direction as of those approaching each other from opposite directions, for both single and double track, in which all the parts of the block-station apparatus are automatically controlled before each section or block of the line is entered by the train.

In the accompanying drawings, Figure 1 represents three track-sections I, II, and III of a railroad provided with this block-signal system in its normal position of rest—*i. e.*, when no train is near. Fig. 2 shows the same when in operation on the approach of a train, and Fig. 3 shows a modified form of the same system.

The system as shown in Figs. 1 and 2 consists of the following parts: first, the block-conductors 1 2 3; second, the block-station apparatus with their current sources or batteries $c\ d\ i\ k$ and with their electromagnetic current switches or relays $g\ e$, $h\ f$, $l\ m$, $o\ n$; third, the signal-wires S, R, T, and U, in which are inserted the signal-bells $r$, 8, 10, $r^3$, and 21 in Fig. 3 and release-relays $p\ q$.

In Fig. 1, $a$ and $b$ represent the rails. The rail $b$ is by the insulations 15 and 19 divided into sections of the usual length, here called 1, 2, and 3. The rails $a$ and $b$ are at the same time used as conductors. The batteries $c$, $d$, $i$, and $k$ are normally connected each with the opposite battery of the next block-station, thus neutralizing each other. The connection of block II is thus as follows: from the positive pole of battery $d$ over switch $e$, section 2 of rail $b$, switch $n$ to the positive pole of battery $i$; further, from the negative pole of battery $i$ over rail $a$ to the negative pole of battery $d$. The battery $c$, however, sends its current through the block-station circuit C around the electromagnet $g$, thus keeping $e$ attracted; $d$ sends its current over D and $h$, keeping $f$ attracted; $i$ sends its current over I and $l$, keeping $m$ attracted, and $k$ sends its current over K and $o$, keeping $n$ attracted.

Fig. 2 shows the manner of operation of the system as shown at rest in Fig. 1. 5 represents the first axle of a train traveling in the direction of the arrow. Through 5 the electromagnet $g$ loses its current, the current from battery $c$ taking the following course: from the positive pole of $c$ over $c'$, $f$, $b$, 5, $a$ to the negative pole of $c$. The switch $e$ will no longer be attracted and will cut the battery $d$ out of the above-described circuit of block II. The switch $e$ will, however, connect the signal-wire S in the circuit of the block II, and the current from battery $i$ of the next but one block-station will now flow along the following path: from positive pole of battery $i$ over $i'$, over switch $n$, section 2 of rail $b$, switch $e$ to the signal-wire S, signal-bell $r$, rail $a$ to the negative pole of battery $i$. On hearing the signal-bell $r$ the block-station guard must set the semaphore 11 on "free" by means of lever 12. The semaphore 11, as well as the other semaphores 14, 16, and 18, should be placed about six hundred and fifty feet from the insulations 15 and 19, respectively. 11 and 16 are for trains traveling in the direction of the arrow near 5, while semaphores 14 and 18 are for trains going in the opposite direction. Let, for instance, Y be the first axle of a train standing in section 3 or passing along in that section, coming either from the direction of the arrow in Fig. 2 or from the opposite direction. The current from the battery $k$ would take the following path: from positive pole of $k$ over $k'$, $m$, $b$, Y, and $a$ to the negative pole of battery $k$. The electromagnet $o$ would get no current, and the switch $n$, no longer attracted thereby, would come in the position of the dotted line. This, however, would cause an interruption of the above-described course of the current from battery $i$, the signal-bell $r$ in block $l$ would become silent, and the semaphore 11 would have to be set on "stop."

The semaphores can also be made automatic by the following simple arrangement: The electromagnet $p$, for instance, is inserted in the signal-wire U of the section 3 behind the signal-bell $r^3$. (See Figs. 1 and 2). If the line is free, $r^3$ will sound, $p$ will be magnetized and will attract the anchor $q$, loosening thereby the cam-wheel $u$, which is turned by the weight $v$, and in turning this wheel $u$ will by means of a wire connection set the semaphore 18 on "free."

In the form shown in Fig. 3 only the rail $b$ is used as a conductor, while for the other parts of the circuits separate conducting-wires parallel with the rails—namely, 1, 2, and 3—are made use of. If there should be present in section 1 the first axle 5 of a train, Fig. 3, this section would be blocked in the following manner: The station guard would close the conductor 25 by means of the hand-switch 24. The electromagnet $g$ is thereby short-circuited in the same way as described in Fig. 2, and the current from the battery $c$ would take the following course: from positive pole of $c$ over $c'$, $f$, 1, 2, 24, 25, and $b$ to the negative pole of $c$. As $g$ loses its current, $e$ will no longer be attracted by it; the battery $i$ of the next but one block-station apparatus will send its current, just as in Fig. 2, from the positive pole of $i$ over $i''$, $n$, 2, $e$, S, $r$, S, and $b$ to the negative pole of battery $i$; $r$ will sound and give the signal for putting the semaphore 11 on "free," all as described for Fig. 2, as the communication between $b$ and 1 over 24 and 25 has exactly the same effect as the communication between $a$ and $b$ by means of the axle 5 in Fig. 2.

The free signal can be electrically transferred directly to the traveling locomotive in the following way: From the signal-wire S a parallel wire S' (called "branch signal-wire") connects with the contact-rail 20, Fig. 3, which is arranged on the track about six hundred and fifty feet from the insulation 15. In traveling over the contact-rail 20 the locomotive will receive the signal as follows: The current from the battery of the next-but-one block-station apparatus will again flow along the course described above—namely, from the positive pole of $i$ over $i''$, $n$, 2, $e$, S', 20, over the contact-shoe 22, arranged underneath the locomotive, through the signal-bell 21 on the locomotive, over axle 5 and rail $b$ to the negative pole of battery $i$. By the ringing of the signal-bell 21 the engine driver knows that sections 2 and 3 are unoccupied and that in block II a current is flowing.

As all the apparatus of the block-stations are made exactly alike, the operation will always be the same, no matter in what direction the track is traveled over.

What I claim, and desire to secure by Letters Patent, is—

Electrical and automatic block-signal system for trains, consisting of block-station apparatus each having two batteries, two relays, two signal-wires with their respective signal-bells and release-relays, further consisting of block-circuit conductors, for which the two rails are partly used, suitable connections between these various parts, so that the semaphore operated by the guard only allows a train to pass out of the section traveled upon, when the signal-bell and release-relays of the next block-station are operated by the current of the battery of the next-but-one block-station, substantially as described.

In testimony whereof I have hereunto set my hand in the presence of two witnesses.

JÖRG LANZ.

Witnesses:
ALVESTO S. HOGUE,
AUGUST FUGGER.